(12) United States Patent
Noble et al.

(10) Patent No.: US 9,090,330 B2
(45) Date of Patent: Jul. 28, 2015

(54) OPENING PLUG AND METHOD OF INSTALLING THE SAME

(75) Inventors: Jack S. Noble, Shoreline, WA (US); Gary D. Oakes, Renton, WA (US); James Miller Wheaton, Collierville, TN (US)

(73) Assignee: THE BOEING COMPANY, Chicago, IL (US)

( * ) Notice: Subject to any disclaimer, the term of this patent is extended or adjusted under 35 U.S.C. 154(b) by 1826 days.

(21) Appl. No.: 12/413,792

(22) Filed: Mar. 30, 2009

(65) Prior Publication Data

US 2010/0243809 A1    Sep. 30, 2010

(51) Int. Cl.
*B64C 1/14* (2006.01)
*B64D 29/08* (2006.01)

(52) U.S. Cl.
CPC .............. *B64C 1/1446* (2013.01); *B64D 29/08* (2013.01); *Y10T 29/49947* (2015.01)

(58) Field of Classification Search
CPC  B64C 1/1446; B64D 29/08; Y01T 29/49947; E06B 9/04; E06B 2009/002; E06B 3/28; E06B 9/02; E04F 19/08
USPC ........................ 244/129.4, 131; 49/463, 457
See application file for complete search history.

(56) References Cited

U.S. PATENT DOCUMENTS

| 2,316,507 | A | * | 4/1943 | Dykeman | 220/302 |
|---|---|---|---|---|---|
| 2,951,674 | A | * | 9/1960 | Rice | 267/141.4 |
| 3,213,494 | A | * | 10/1965 | Mayers et al. | 49/492.1 |
| 3,360,910 | A | * | 1/1968 | Soltis | 55/483 |
| 3,841,682 | A | * | 10/1974 | Church et al. | 293/142 |
| 4,251,482 | A | * | 2/1981 | Sanderson et al. | 422/26 |
| 4,422,813 | A | * | 12/1983 | Greenbaum | 411/38 |
| 4,878,792 | A | * | 11/1989 | Frano | 411/339 |
| 4,969,065 | A | * | 11/1990 | Petri | 361/804 |
| 5,322,402 | A | * | 6/1994 | Inoue | 411/510 |
| 5,339,491 | A | * | 8/1994 | Sims | 16/2.2 |
| 5,397,206 | A | * | 3/1995 | Sihon | 411/544 |
| 5,695,222 | A | | 12/1997 | Hodges | |
| 5,901,502 | A | * | 5/1999 | Rafalski et al. | 49/463 |
| 6,073,574 | A | * | 6/2000 | King et al. | 114/364 |
| 6,119,305 | A | * | 9/2000 | Loveall et al. | 16/2.2 |
| 7,017,891 | B2 | * | 3/2006 | Izabel | 267/141.4 |
| 7,556,220 | B2 | * | 7/2009 | Schulz | 244/129.4 |
| 2009/0314894 | A1 | * | 12/2009 | Frisch et al. | 244/131 |

* cited by examiner

*Primary Examiner* — Valentina Xavier
(74) *Attorney, Agent, or Firm* — Hanley, Flight & Zimmerman, LLC (57) ABSTRACT

A device is used to plug an opening in a structure having a front side and a back side. The device includes a removable plug body for plugging the opening, and a retainer that is expandable into engagement with the back side of the structure to retain the plug in the opening. Means coupled with the retainer and the plug is provided for expanding the retainer.

33 Claims, 7 Drawing Sheets

OPENING PLUG AND METHOD OF INSTALLING THE SAME

TECHNICAL FIELD

This disclosure generally relates to closures for openings, and deals more particularly with a device for plugging and sealing an opening in a structure, such as an exterior access opening in an aircraft panel.

BACKGROUND

Vehicles such as aircraft are often provided with exterior access openings in order to allow service personnel to access interior components for, without limitation, inspection, maintenance and/or adjustment. These access openings may be located in aerodynamic exterior surfaces, and therefore may be plugged with covers that are preferably as flush as possible with the skin of the aircraft in order to reduce turbulent airflow over the opening.

Known covers for access openings in aircraft structures may include a plug having a separately installed sleeve which may render this type of plug difficult to install multiple applications with differing surface contours. Another type of known plug employs glue to hold the plug in the opening, however these glued plugs may not be easily removed, and may require cleaning and the use of additional glue during reinstallation.

Accordingly, there is a need for an access opening plug that is adapted for use with structures having a variety of contours, and which is self-retaining in the opening, without the use of glue. There is also a need for a plug of the type mentioned above which may be easily and quickly removed and reinstalled entirely from one side of the opening.

SUMMARY

The disclosed embodiments provide a relatively simple self retaining aerodynamic plug for plugging and sealing access openings in a structure, such as those used in commercial and military aircraft. The plug may be easily and quickly installed from one side of the opening, and may not require the assembly of parts for its installation. The disclosed access opening plug has an outer surface that extends substantially flush with the skin or other outer surface of the structure so as to maintain aerodynamic airflow over the access opening. The plug may be especially suitable for plugging relative small openings, and be installed or removed using a simple tool such as a screwdriver to turn a screwdrive. The screwdrive compresses and expands a retainer into engagement with the backside of the structure in order to draw the plug tightly down into a recess in the structure. The retainer may comprise a compressible O-ring seal which may create a relatively tight seal around the entire opening between the plug and the structure.

According to one disclosed embodiment, a device is provided for plugging an opening in a structure having first and second opposite sides. The device includes a removable plug body for plugging the opening and a retainer that is expandable into engagement with the second side of the structure for retaining the plug in the opening. Means coupled with the retainer and the plug are provided for expanding the retainer. The plug may include tapered sides which engage a chamfered edge surrounding the opening. An outer surface of the plug body covers the opening and extends substantially flush with the first side of the structure.

According to another embodiment, a device is provided for sealing an opening in a structure having a first side and a second side. The device includes a plug body disposed in the opening and engaging the first side of the structure. Means coupled with the plug body are provided for retaining the plug body in the opening, including a compressible member that expands laterally when compressed to seal against the second side of the structure. Means are provided for compressing the compressible member and for drawing the compressible member down against the second side of the structure. The plug body may be recessed within the structure and includes an outer surface that is substantially flush with the first side of the structure. The means for compressing the compressible member includes a screw drive extending through the plug body and which is accessible from the first side of the structure.

According to a further embodiment, a device is provided for plugging an access opening in an aircraft structure. The device includes a removable plug for plugging the opening from a front side of the structure, and a retainer on the back side of the structure that is displaceable between a first position allowing the plug body to be removed from the opening and a second position retaining the plug body in the opening. A drive is provided for coupling the plug body with the retainer and for displacing the retainer between the first and second positions thereof. The drive extends through the plug body and is accessible from the front side of the structure.

According to still another embodiment, a method is provided of installing a plug within an opening in a structure. The method includes placing a plug body in the opening from a front side of the structure and accessing a screwdrive from the front side of the structure. The screwdrive is used to displace a seal on the back side of the structure, and the displaced seal is used to retain the plug body in the opening. Using the screwdrive to deform the seal may include compressing the seal between the plug body and a plate.

The disclosed embodiments satisfy the need for a plug that may be used to plug and seal an access opening which may be used with a wide range of structural surface contours, and which may be easily installed or removed with simple tools, without the need for glue.

BRIEF DESCRIPTION OF THE ILLUSTRATIONS

DETAILED DESCRIPTION

Figure 1:
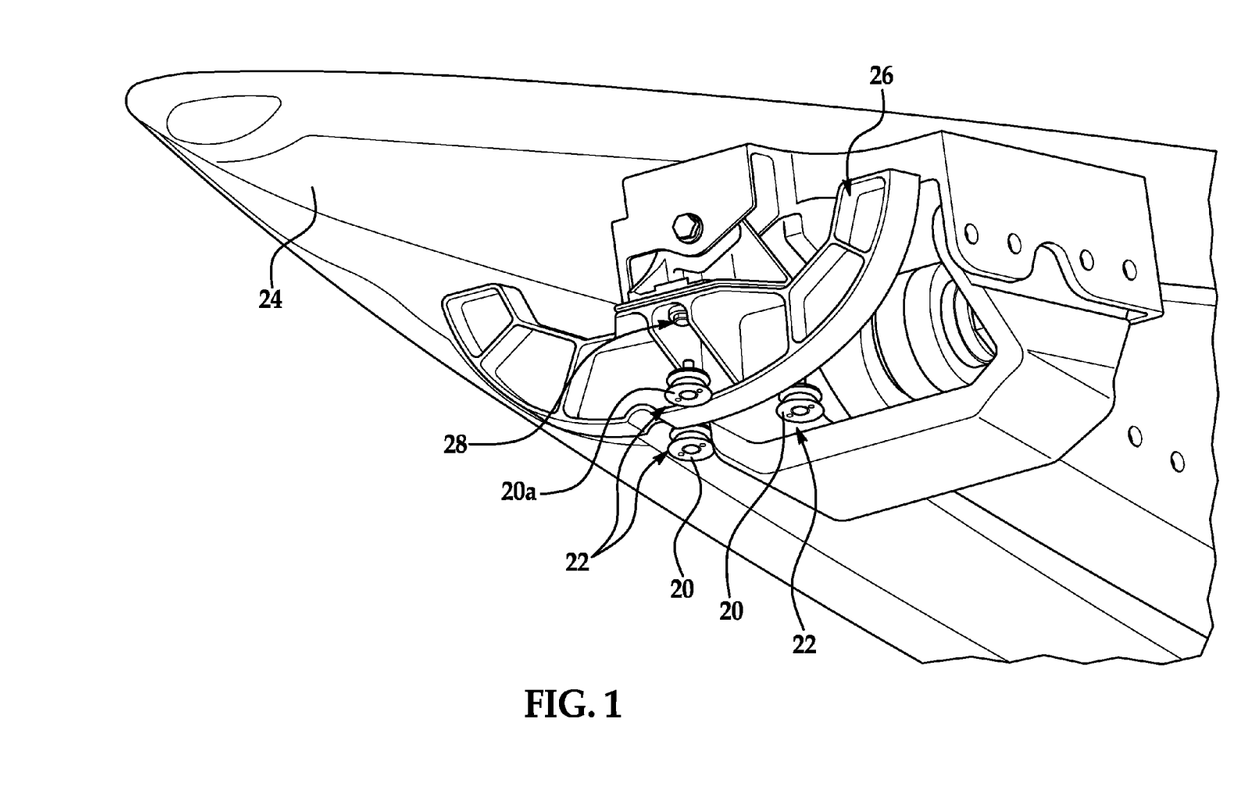
FIG. 1 is an illustration of a perspective view of a typical flap track fairing having access openings sealed by plugs according to the disclosed embodiments.

Referring first to FIG. 1, the disclosed embodiments relate to a plug 20 for plugging and sealing openings 22 in a structure 24. In the illustrated embodiment, the structure 24 comprises a slat track fairing which protects and streamlines a mechanism 26 controlling wing slats (not shown) on an aircraft (not shown). However, the plug 20 may be used to plug and seal openings 22 in a variety of other structures, particularly in so called blind side applications where the plug 20 must be installed entirely from only one side of the structure 24. In the illustrated embodiment, the structure 24 includes first and second opposite sides which may also be respectively referred to herein as front side 24a and the backside 24b. In aircraft applications, the openings 22 are sometimes referred to as access openings which allow service personnel to access components such as the mechanism 26, inside a structure 24 for purposes of inspection, maintenance, or adjustment. For example, service personnel may remove plug 20a in order to adjust or tighten a bolt 28 forming part of the mechanism 26. In some cases, the plug 20 and the corresponding opening 22 may be relatively small, measuring for example, and without limitation, approximately one inch in diameter. While the plugs 20 and the access openings 22 are shown as being substantially circular, other plug geometries may be possible.

Figure 2:
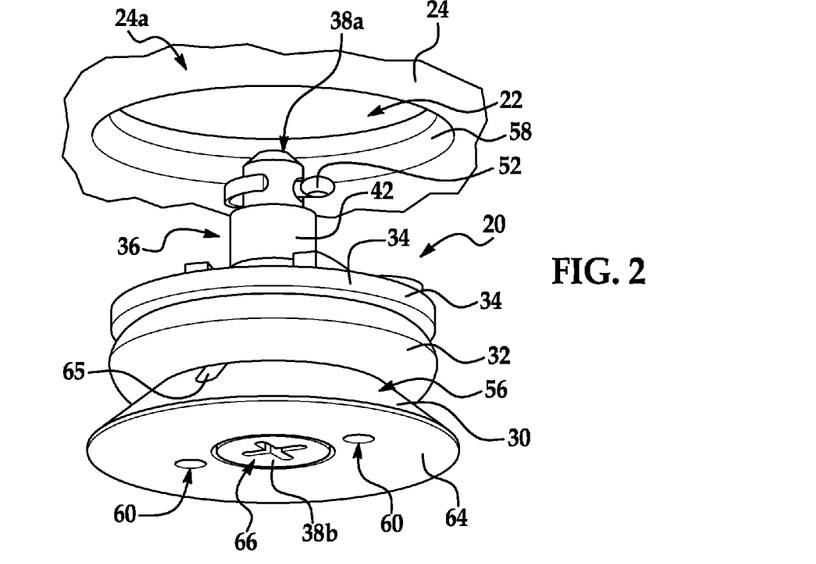
FIG. 2 is an illustration of an isometric view showing the plug about to be inserted into an access opening from the front side of a structure.
Figure 3:
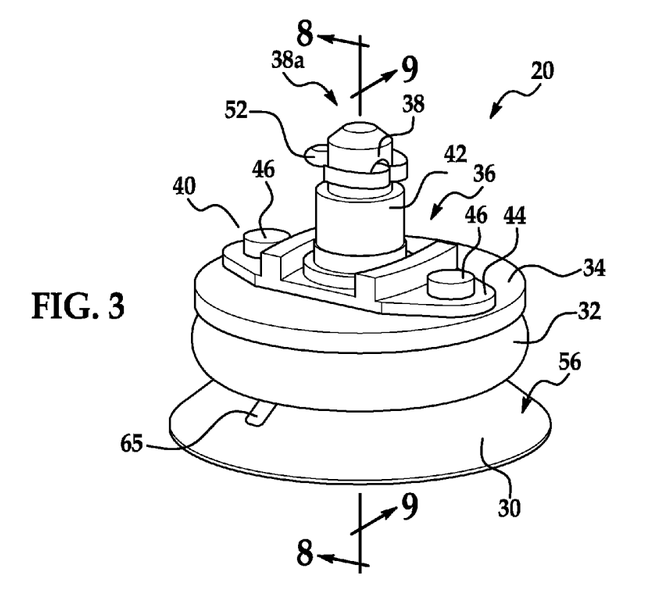
FIG. 3 is an illustration of an isometric view of the plug of FIG. 2, better showing components on the back side of the plug.
Figure 4:
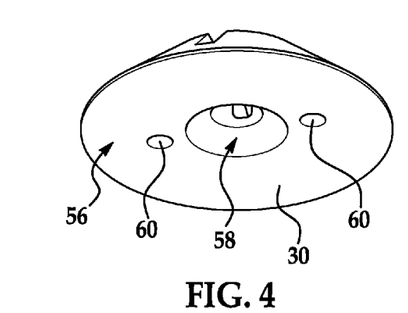
FIG. 4 is an illustration of an isometric view of the plug body.
Figure 5:
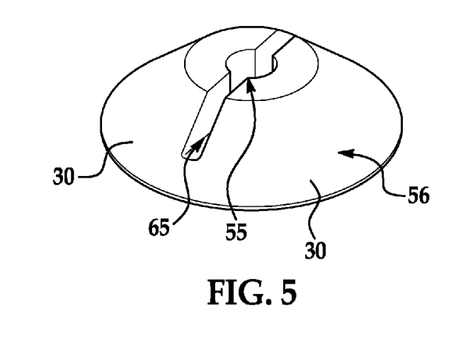
FIG. 5 is an illustration of an isometric view of the plug body similar to FIG. 4, but viewed from a different angle.

Attention is now generally directed to FIGS. 2-11 which illustrate additional details of the plug 20. As shown in FIGS. 2 and 3, the plug 20 broadly comprises a plug body 30, an O-ring retainer 32 and a screwdrive 36 that are concentrically aligned and keyed together to prevent their relative rotation. The plug body 30 has the general shape of a truncated cone with tapered sides 56. The tapered sides 56 are adapted to engage and seat on a chamfered edge 58 (FIG. 2) of the structure 24 surrounding the opening 22. The chamfered edge 58 allows the plug body 30 to be recessed within the structure 24 so that the outer surface 64 lies substantially flush with the front side 24a of the structure 24 (see FIG. 11).

The O-ring retainer 32 is donut shaped and may have a substantially circular cross section. The O-ring retainer 32 is sleeved over and bears against the tapered sides 56 of the plug body 30. The O-ring retainer 32 may be formed of any suitable plastically deformable material which expands laterally as it is compressed.

Figure 6:
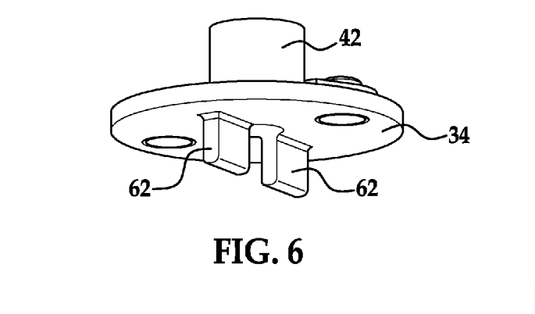
FIG. 6 is an illustration of an isometric view of the retainer plate and the nut plate.
Figure 7:
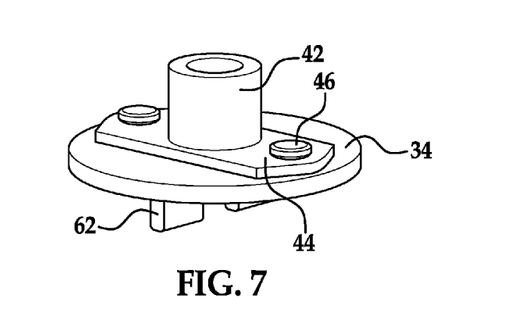
FIG. 7 is an illustration of another isometric view of the retainer plate and the nut plate, similar to FIG. 6, but viewed from a different angle.

The screwdrive 36 broadly comprises a screw 38, a nut plate 40 and a retainer plate 34. The screw 38 extends axially through a central opening 55 (FIG. 5) in the plug body 30 and, as shown on FIG. 10, includes male threads 48 that are received by female threads 50 in the nut plate 40. As seen in FIGS. 6 and 7, the nut plate 40 includes a threaded nut 42 and laterally extending flanges 44 which are secured to the retainer plate 34 by rivets 46, or other fasteners. A cotter pin 52 (FIGS. 2 and 3) or similar retainer extends through a key hole 54 (FIGS. 8 and 9) in one end 38a of the screw 38 in order to limit the travel of the nut plate 40 relative to the screw 38. The other end 38b of the screw 38 is flared within the plug body 30 and includes a tool feature 66 adapted to receive a tool (not shown) for rotating the screw 38. In the illustrated example, the tool receiving feature 66 is a cross slot adapted to receive a screwdriver head (not shown), however a variety of other tool receivers features may be used.

Figure 8:
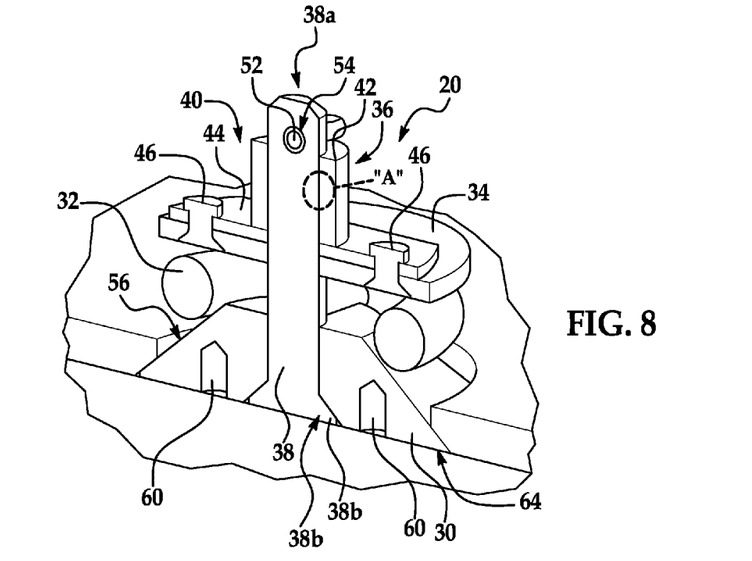
FIG. 8 is an illustration of a sectional view taken along the line 8-8 in FIG. 3, but showing the plug having been installed in the opening, before being sealed.
Figure 9:
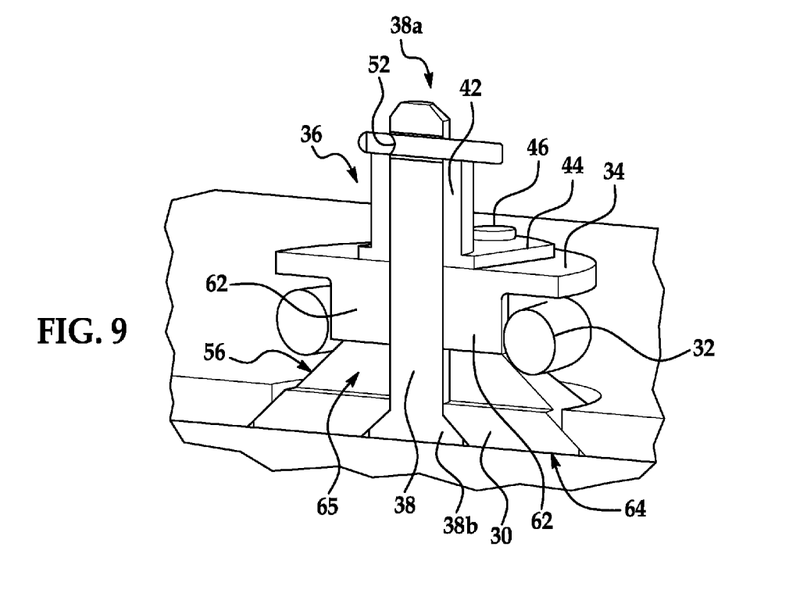
FIG. 9 is an illustration of a sectional view similar to FIG. 8, but taken along the line 9-9 in FIG. 3.
Figure 10:
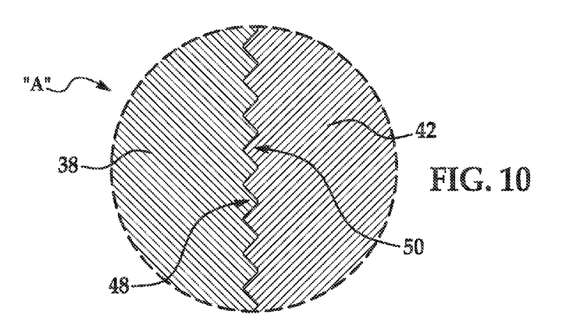
FIG. 10 is an illustration of the area designated as "A" in FIG. 8.
Figure 11:
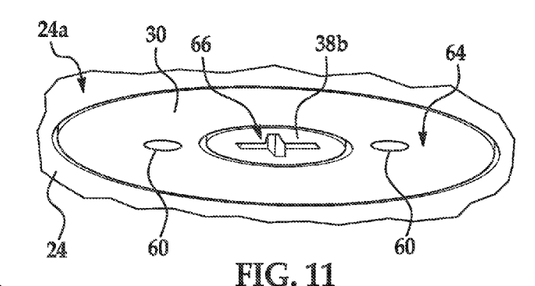
FIG. 11 is an illustration of an isometric view of the front surface of the structure and the outer, flush surface of the plug body.

Referring to FIGS. 8 and 9, the O-ring retainer 32 is captured between the tapered sides 56 of the plug body 30 and the retainer plate 34. The diameter of the retainer plate 34 is slightly less than the diameter of the plug body 30. Similarly, in its uncompressed state, the O-ring retainer 32 is also slightly smaller in diameter than the maximum diameter of the plug body 30. As will be discussed below in more detail, rotation of the screw 38 by a tool (not shown) draws the retainer plate 34 toward the plug body 30, thereby compressing the O-ring retainer 32 (see FIGS. 12 and 13), and causing the O-ring retainer to expand laterally. Rotation of the retainer plate 34 relative to the plug body 30 is prevented by a pair of spaced apart lugs 62 (FIGS. 6 and 7) which are secured to the retainer plate 34 and into a slot 65 (FIG. 5) in the plug body 40.

As shown in FIGS. 2, 4, 8 and 11, the outer face 64 of the plug body 30 may include a pair of spaced apart recesses 60 adapted to receive a spanner tool (not shown). The spanner tool may be used to hold the plug body 30 against rotation as the screw 38 is being rotated during the plug installation.

Figure 12:
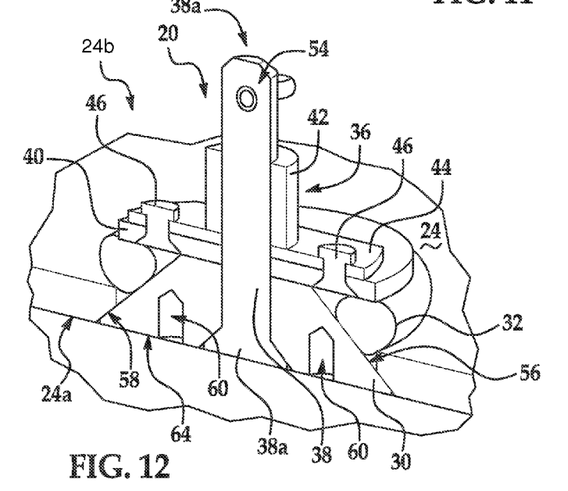
FIG. 12 is an illustration of a sectional view similar to FIG. 8, but showing the O-ring retainer having been compressed to retain and seal the plug body within the access opening.

Referring to FIG. 2, in use, the plug 20 is readied for installation by adjusting the screwdrive 36 such that the O-ring retainer 32 is substantially uncompressed. The plug 20 is aligned with the opening 22 on the front side 24a of the structure 24. The plug 20 may then be moved axially into the opening 22 until the tapered sides 56 of the plug body 30 seat against the chamfered edge 58 around the opening 22, as shown in FIGS. 8 and 9. A tool (not shown) may then inserted into the tool receiver 66 and used to turn the screwdrive 36. The screwdrive 36 draws the nut plate 40, and thus the retainer plate 34 toward the plug body 30, thereby compressing the O-ring retainer 32, as shown in FIGS. 12 and 13.

Figures 13, 14:
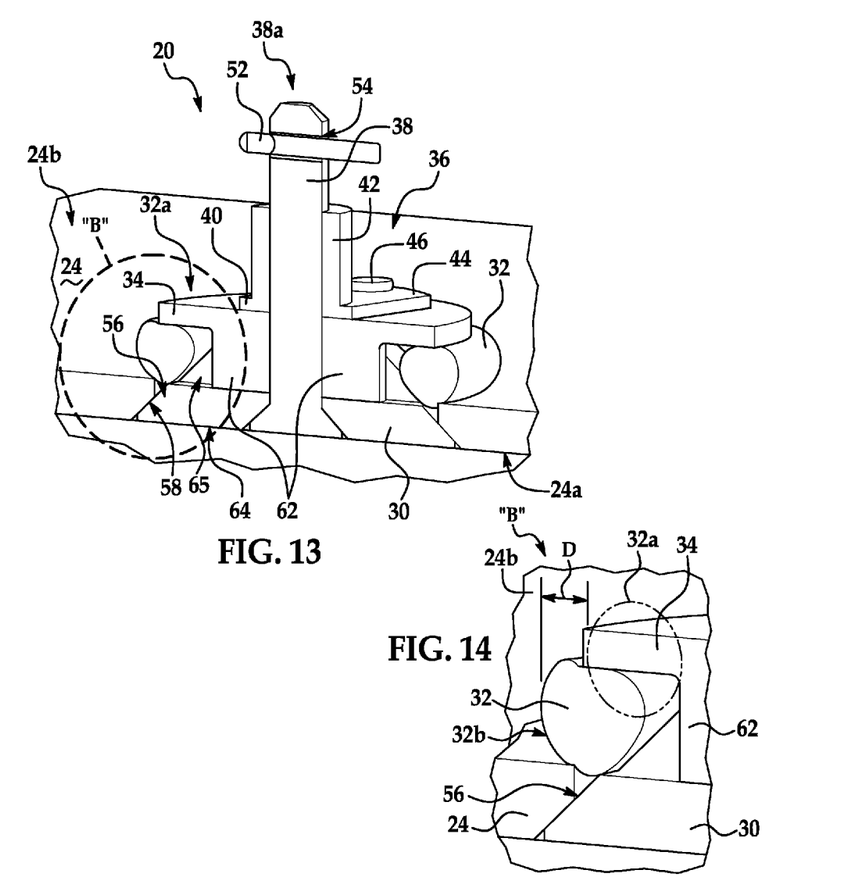
FIG. 13 is an illustration of a sectional view similar to FIG. 9, but showing the O-ring retainer having been compressed to retain and seal the plug body within the access opening.
FIG. 14 is an illustration of the area designated as "B" in FIG. 13.

Referring particularly to FIG. 14, as the O-ring retainer 32 is compressed against the tapered sides 56 of the plug body 30, the O-ring retainer 32 expands from a first position shown at 32a, laterally outward a distance D to a second position 32b so as to overlie and be compressed against the inside surface 24b of the structure 24. As seen in FIGS. 12, 13 and 14, in the fully installed position of the plug 20, the O-ring retainer 32 forms a seal between the tapered sides 56 of the plug body 30 and the inside surface 24b of the structure 24 surrounding the opening 22, while also functioning to retain the plug body 30 within the opening 22 due to the interfering overlap of the retainer 32 and the inside surface 24b of the structure 24.

In order to remove the plug 20 to gain access to the opening 22, a tool (not shown) may be inserted into the tool receiver 66 and rotated in a direction opposite of that during the installation process. The retainer plate 34 is displaced away from the inside surface 24b of the structure 24, allowing the O-ring retainer 32 to spring back to its normal, substantially uncompressed state shown in FIGS. 8 and 9. As the O-ring retainer 32 decompresses, it contracts laterally inwardly to clear the structure 24, thereby allowing the plug 20 to be removed from the opening 22.

Figure 15:
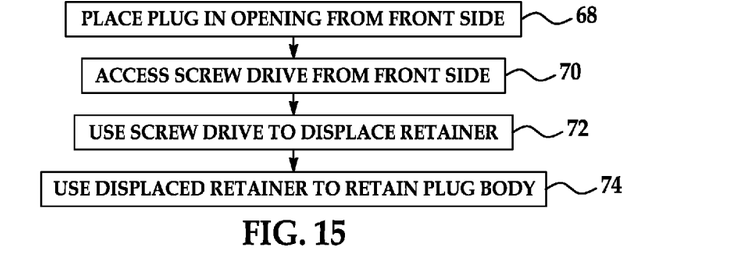
FIG. 15 is an illustration of a flow diagram showing the steps of a method of installing a plug in an access opening according to the disclosed method embodiments.

FIG. 15 graphically illustrates the steps of a method of installing a plug 20 within an access opening 22. Beginning at step 68, the plug 20 is placed within the opening 22 from the front side 24a of the structure 24. Next, at 70, the screwdrive 36 is accessed from the front side 24a of the structure 24. As previously indicated, a tool (not shown) may be inserted into the tool recess 66 in order to turn the screw 38. As shown at 72, the screwdrive 36 is used to displace the O-ring retainer 32 by compressing and thereby laterally expanding the O-ring retainer 32. At 74, the displaced and expanded O-ring retainer 32 is used to retain the plug body 30 within the opening 22.

Figure 16:
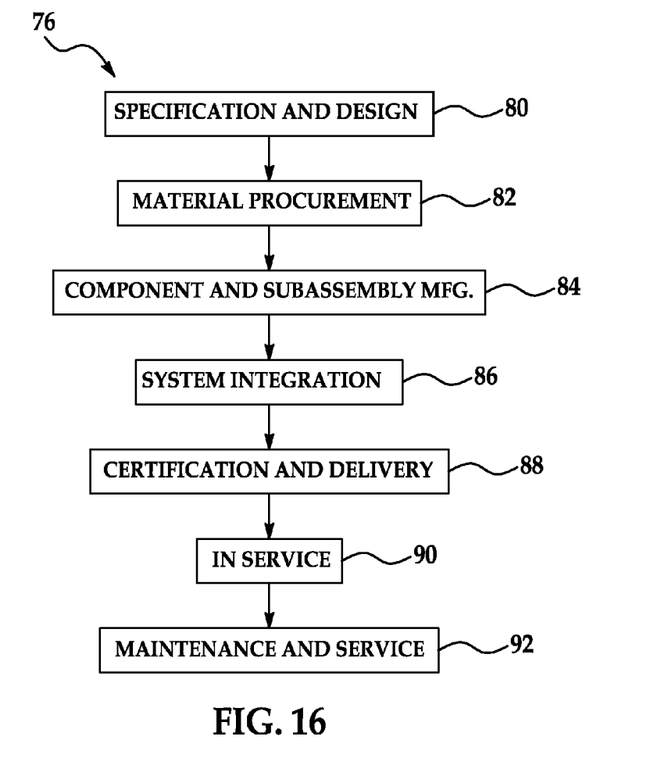
FIG. 16 is an illustration of a flow diagram of aircraft production and service methodology.
Figure 17:
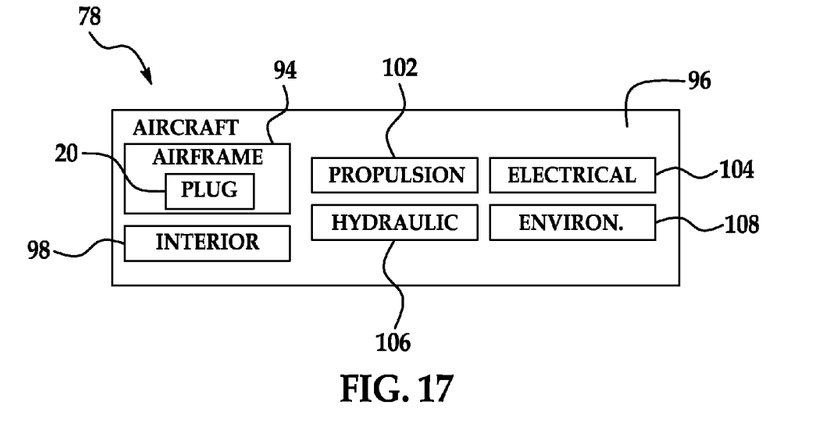
FIG. 17 is an illustration of a block diagram of an aircraft.

Embodiments of the disclosure may find use in a variety of potential applications, particularly in the transportation industry, including for example, aerospace, marine and automotive applications. Thus, referring now to FIGS. 16 and 17, embodiments of the disclosure may be used in the context of an aircraft manufacturing and service method 76 as shown in FIG. 16 and an aircraft 78 as shown in FIG. 17. During pre-production, exemplary method 76 may include specification and design 80 of the aircraft 78 and material procurement 82 in which the disclosed plug 20 may be specified for use in plugging various access openings in the aircraft 78. During production, component and subassembly manufacturing 84 and system integration 86 of the aircraft 78 takes place. The disclosed method may be used to install the plug 20 in openings in the aircraft 78 during these production processes where the installation must be conducted from only one side of the opening. The plug 20 may assembled and integrated with other subassemblies. Thereafter, the aircraft 78 may go through certification and delivery 88 in order to be placed in service 90. While in service by a customer, the aircraft 78 is scheduled for routine maintenance and service 92 (which may also include modification, reconfiguration, refurbishment, and so on). The disclosed method 76 may be used to install the plug 20 in openings in the aircraft 78 during the maintenance and service 92.

Each of the processes of method 76 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 17, the aircraft 78 produced by exemplary method 76 may include an airframe 94 with a plurality of systems 96 and an interior 98. The disclosed plug 20 may form part of, or may be installed on the airframe 94. Examples of high-level systems 96 include one or more of a propulsion system 102, an electrical system 104, a hydraulic system 106, and an environmental system 108. Any number of other systems may be included. Although an aerospace example is shown, the principles of the disclosure may be applied to other industries, such as the marine and automotive industries.

The plug 20 and plug installation method embodied herein may be employed during any one or more of the stages of the production and service method 76. For example, components or subassemblies corresponding to production process 84 may incorporate the plug 20. Also, one or more method embodiments, or a combination thereof may be utilized during the production stages 84 and 86, for example, by substantially expediting assembly of or reducing the cost of an aircraft 78. Similarly, the disclosed plug and installation method may be utilized while the aircraft 78 is in service, for example and without limitation, as well as during maintenance and service 92.

Although the embodiments of this disclosure have been described with respect to certain exemplary embodiments, it is to be understood that the specific embodiments are for purposes of illustration and not limitation, as other variations will occur to those of skill in the art.

What is claimed:

1. An apparatus, comprising:
   a removable plug body to plug an opening in a structure having first and second opposite sides, the plug to extend through the opening between the first and second sides;
   an elastomeric retainer expandable into engagement with the second side of the structure to retain the plug body in the opening; and
   means coupled with the elastomeric retainer and the plug body for expanding the elastomeric retainer to retain the plug body in the opening and, after the plug body has been retained in the opening, enabling the plug body to be removed from the opening.

2. The apparatus of claim 1, wherein the plug body includes tapered sides to engage the structure.

3. The apparatus of claim 1, wherein the plug body includes an outer surface to cover the opening and be substantially flush with the first side of the structure in an area of the opening.

4. The apparatus of claim 1, wherein the elastomeric retainer includes an expandable seal to extend around the opening.

5. The apparatus of claim 1, wherein the expanding means includes a screw drive.

6. The apparatus of claim 5, wherein the screw drive includes a screw to be accessible from the first side of the structure, and a nut to be on the second side of the structure and coupled with the screw to apply force to the elastomeric retainer.

7. The apparatus of claim 1, wherein the elastomeric retainer includes a compressible seal to surround the opening on the second side of the structure, and the expanding means includes a displaceable plate connected to a drive to compress the seal against the second side of the structure, and the drive to be accessible from the first side of the structure to displace the plate.

8. An apparatus, comprising:
   a plug body insertable into an opening in a structure having first and second opposite sides, the plug body to engage the first side of the structure;
   means coupled with the plug body for retaining the plug body in the opening, including an elastomeric member that expands laterally when compressed to overlap and seal against the second side of the structure; and
   means for compressing the elastomeric member against the second side of the structure.

9. The apparatus of claim 8, wherein the plug body is to be recessed within the structure and includes an outer surface to be substantially flush with the first side of the structure.

10. The apparatus of claim 8, wherein the means for compressing the elastomeric member includes a screw to extend through the plug body and to be accessible from the first side of the structure.

11. The apparatus of claim 8, wherein the elastomeric member is an O-ring or seal.

12. The apparatus of claim 8, wherein the means for compressing the elastomeric member includes a plate for engaging and applying a compression force on the elastomeric member.

13. The apparatus of claim 12, wherein the means for compressing the elastomeric member includes a screw drive for drawing the plate toward the plug body and against the elastomeric member.

14. An apparatus, comprising:
 a removable plug body for plugging an opening from a front side of a structure, the plug to extend through the opening between the front side and a back side of the structure;
 a retainer to be on the back side of the structure, the retainer to be displaceable between a first position enabling the plug body to be removed from the opening and a second position retaining the plug body in the opening; and
 a drive to couple the plug body with the retainer to displace the retainer between the first and second positions, the drive to extend through the plug body and to be accessible from the front side of the structure.

15. The apparatus of claim 14, wherein the retainer includes a compressible member to extend around the opening and to form a seal between the plug body and the structure.

16. The apparatus of claim 15, wherein the compressible member laterally expands when compressed, and the drive includes a plate for compressing the compressible member.

17. The apparatus of claim 14, wherein the plug body includes tapered sides, the retainer includes a compressible O-ring seated on the tapered sides of the plug body, and the drive includes a plate and a threaded screw to apply a compression force on the O-ring through the plate.

18. The apparatus of claim 14, wherein the drive includes a rotatable screw having a threaded portion and a head within the plug body adapted to be coupled with a tool for rotating the screw, a plate to displace the retainer, and a threaded nut secured to the plate and receiving the threaded portion of the screw.

19. The apparatus of claim 18, further comprising: means for preventing rotation of the plug body with the screw.

20. An apparatus, comprising:
 a plug body to plug an opening, the plug body having tapered sides to engage a chamfered edge on a front side of a structure surrounding the opening, and having an outer surface to be substantially flush with the front side of the structure;
 a compressible seal to seal the plug body to the structure and to retain the plug body on the structure;
 a displaceable plate to compress and expand the seal into engagement with a rear side of the structure;
 a screw drive extending through the plug body to displace the plate, including a tool receiving head accessible through the outer surface of the plug body and to receive a tool used to turn the screw drive, the screw drive further including a threaded screw and a nut secured to the plate for threadably receiving the threaded screw.

21. The apparatus of claim 1, wherein the structure comprises an aircraft structure.

22. The apparatus of claim 14, wherein the opening comprises an access opening and the structure comprises an aircraft structure.

23. The apparatus of claim 20, wherein the opening comprises an access opening and the structure comprises an aircraft structure.

24. An apparatus, comprising:
 a first body, a second body coupled to the first body, and a seal positioned between the first and second bodies, the first body comprising a tapered surface to engage an opening of a structure through which the first and second bodies and the seal are to be at least partially inserted; and
 an externally accessible adjuster to extend through the first body, the seal and the second body to control movement of the first body relative to the second body, movement of the second body toward the first body to compress the seal into engagement with an interior surface surrounding the opening to seal the opening and retain the first and second bodies and the seal relative to the opening, movement of the second body away from the first body to enable the seal to relax to enable the first and second bodies and the seal to be at least partially inserted through the opening.

25. The apparatus of claim 24, wherein a surface of the first body is to be substantially flush with an exterior surface surrounding the opening.

26. An apparatus, comprising:
 a first body, a second body coupled to the first body, and a seal positioned between the first and second bodies, the first body comprising a tapered surface to engage an opening of a structure through which the first and second bodies and the seal are to be at least partially inserted; and
 an externally accessible adjuster to extend through the first body, the seal and the second body to control movement of the first body relative to the second body, movement of the second body toward the first body to compress the seal into engagement with an interior surface surrounding the opening to seal the opening and retain the first and second bodies and the seal relative to the opening, movement of the second body away from the first body to enable the seal to relax to enable the first and second bodies and the seal to be at least partially inserted through the opening, wherein the first body defines a groove to receive one or more lugs of the second body to guide the movement of and substantially prevent rotation of the second body relative to the first body.

27. The apparatus of claim 24, wherein the tapered surface comprises a substantially conical surface.

28. The apparatus of claim 24, wherein the opening comprises an access opening and the structure comprises an aircraft structure.

29. The apparatus of claim 7, further comprising means for guiding movement of and preventing rotation of the plate relative to the plug body.

30. An apparatus, comprising:
 a removable plug body to plug an opening in a structure having first and second opposite sides, the plug to extend through the opening between the first and second sides;
 a retainer expandable into engagement with the second side of the structure to retain the plug body in the opening; and
 means coupled with the retainer and the plug body for expanding the retainer, the retainer includes a compressible seal to surround the opening on the second side of the structure, and the expanding means includes a displaceable plate connected to a drive to compress the seal against the second side of the structure, and the drive to be accessible from the first side of the structure to displace the plate; and
 means for guiding movement of and preventing rotation of the plate relative to the plug body, wherein the plug body defines one or more apertures to receive corresponding structure of the plate to guide the movement of and substantially prevent rotation of the plate relative to the plug body.

31. The apparatus of claim 30, wherein the one or more apertures comprise one or more slots.

32. The apparatus of claim 30, wherein the structure comprises a lug.

33. An apparatus, comprising
- a removable plug body for plugging an opening from a front side of a structure, the plug to extend through the opening between the front side and a back side of the structure;
- a retainer to be on the back side of the structure, the retainer to be displaceable between a first position enabling the plug body to be removed from the opening and a second position retaining the plug body in the opening; and
- a drive to couple the plug body with the retainer to displace the retainer between the first and second positions, the drive to extend through the plug body and to be accessible from the front side of the structure; and
- a movable portion, wherein the plug body defines one or more apertures to receive corresponding structure of the portion to guide movement of and substantially prevent rotation of the portion relative to the plug body.

\* \* \* \* \*